United States Patent [19]

Collins

[11] 4,020,927

[45] May 3, 1977

[54] BRAKE MECHANISM FOR TURNSTILES AND THE LIKE

[75] Inventor: Terence J. Collins, Schaumberg, Ill.

[73] Assignee: Qonaar Corporation, Elk Grove Village, Ill.

[22] Filed: Aug. 9, 1976

[21] Appl. No.: 712,775

[52] U.S. Cl. .................................... 188/184; 49/43; 49/46

[51] Int. Cl.$^2$ .................... F16D 59/00; E05D 7/086

[58] Field of Search .......................... 49/46, 47, 43; 105/341.5; 188/85, 180, 184, 185

[56] References Cited

UNITED STATES PATENTS

| | | | |
|---|---|---|---|
| 1,578,660 | 3/1926 | Hedley et al. | 49/43 |
| 3,349,876 | 10/1967 | Sheckells | 188/185 |
| 3,364,620 | 1/1968 | Hess et al. | 49/43 |

*Primary Examiner*—Duane A. Reger
*Attorney, Agent, or Firm*—McDougall, Hersh & Scott

[57] ABSTRACT

A turnstile construction wherein arms normally block the path of movement of persons passing through the turnstile, the arms being engaged when authorized passage is available resulting in movement of the arms either by the force of the person passing through. A brake is provided so that bi-directional speed control is automatically provided in all modes of use. The brake mechanism is associated with a support for the arms to limit the speed of movement of the arms, particularly at the conclusion of the movement required for the passage of one person through the turnstile. A cam structure is drivingly connected to the support to disable the brake means during a substantial portion of the arm movement. As the arm movement approaches the end of a cycle, the cam structure provides for repositioning of the brake means whereby the brake means are able to slow down arm movement, for example, if the person using the turnstile is attempting to move too fast.

8 Claims, 7 Drawing Figures

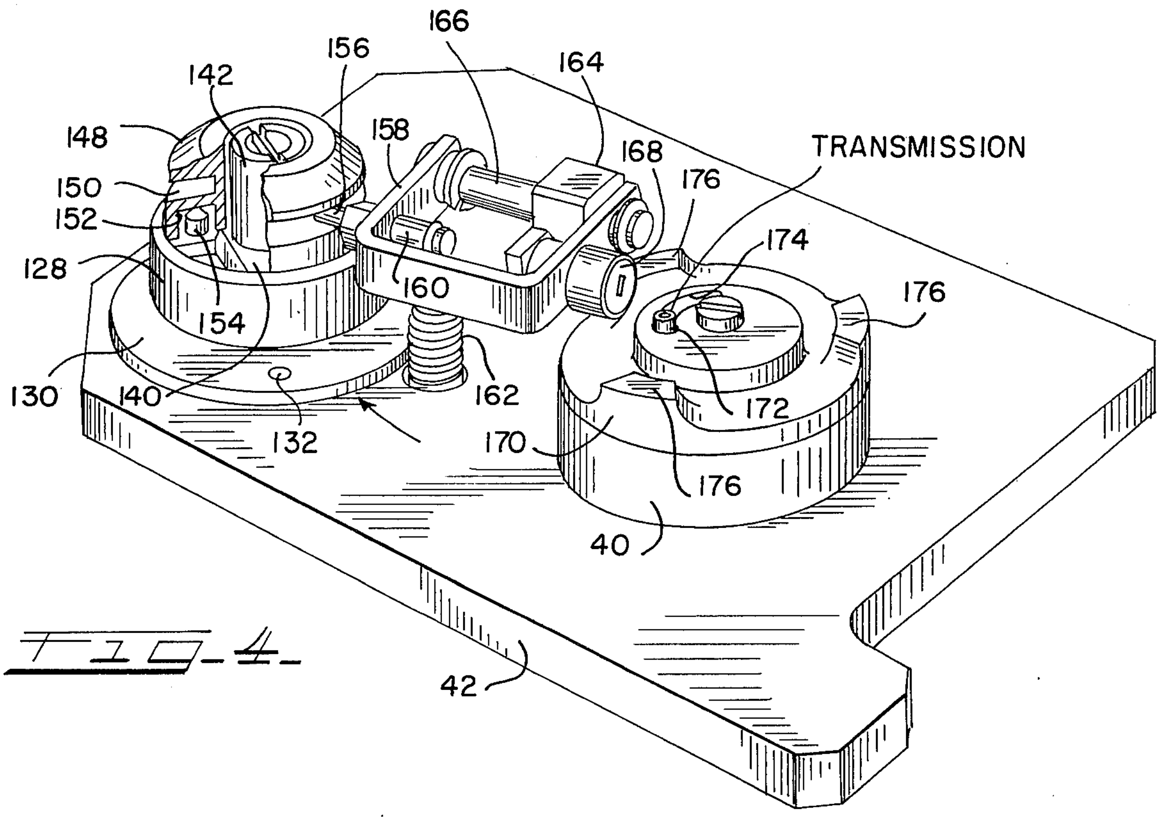
FIG-4-
FIG-3-
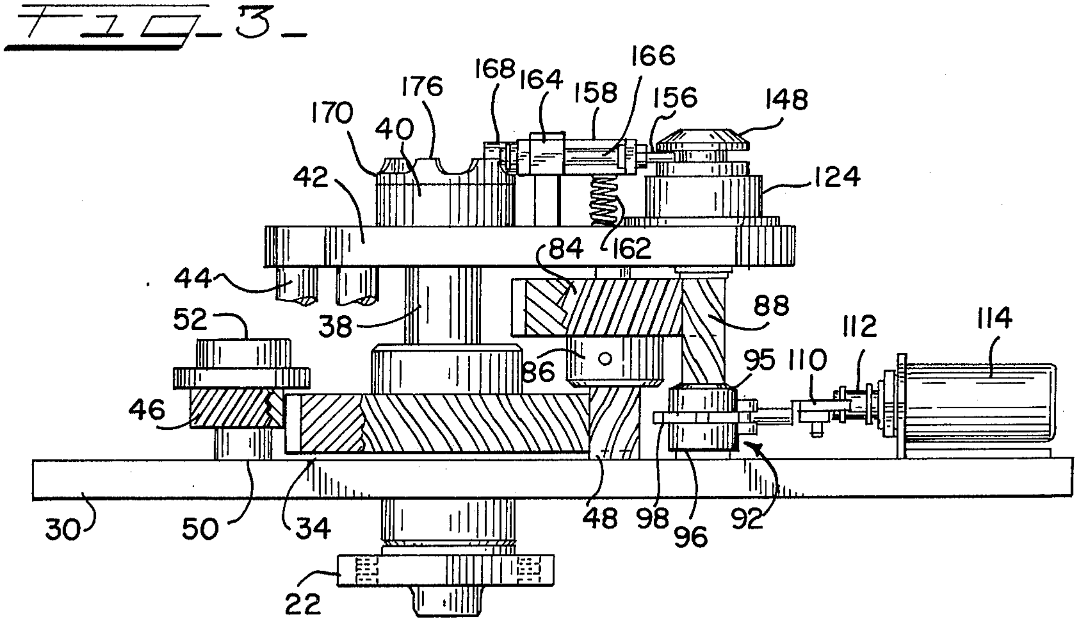

BRAKE MECHANISM FOR TURNSTILES AND THE LIKE

This invention relates to a brake mechanism which is particularly suitable for use in turnstile constructions or for other applications where similar functions are involved. The invention will be particularly described in connection with turnstiles of the type employed for transit systems, for entry into stadiums or other entertainment areas, and for a variety of other purposes.

In a typical turnstile design, arms are supported on a head, and the head rotates when the arms are pushed by a person desiring to pass through the turnstile. In some instances, the head movement is motorized whereby the person moving through the turnstile may provide only part of the driving force of the arms.

In order to control passage through a turnstile, various locking means have been developed. These locking means may normally prevent movement in both directions or may prevent movement in only one direction while being freewheeling in the other direction. Where movement in one or both directions is controlled, the presentation of a fare will permit a person to pass through the turnstile. The unlocking of the turnstile for the person may be accomplished manually by an attendant or automatically if a fare receiving means with automatic head mechanism control is available.

In developing structures which accomplish the above noted aims, various problems have been encountered. In some mechanisms, the placing of an undue load on an arm as when someone leans heavily on the arm, has been known to jam the system. Similarly, the application of a sudden load, for example if someone attempts to run through the turnstile, can lead to jamming or other undesirable disruption in the operation.

Other problems have developed in attempting to "cheat" the system, for example, where a person tried to pass through by pulling an arm partially toward himself, that is, by pulling an arm in the "free-wheeling" direction. In prior systems, this has enabled individuals to provide enough room for passing through, particularly since the arm, when pulled forward, will still move back as the person passes through.

A construction which resolved in a highly efficient fashion problems of the type described is set forth in Collins application Ser. No. 572,962 entitled "Turnstile Head Mechanism Construction," now U.S. Pat. No. dated This application included a description of a brake mechanism which was particularly included to maintain the speed of movement of certain elements at no greater than a predetermined maximum speed. The construction particularly comprised a governor which became operative when a certain rotational speed was achieved, the governor serving to introduce a reactive force which would prevent movement through the turnstile at speeds which could cause disruption in the system. For example, the arrangement avoided damage to mechanisms which could result if undue speeds of movement were experienced.

The speed governor or brake of the aforementioned application employed a spring mechanism which determined the braking characteristics of the device. In order to provide proper controls, it was necessary to use springs which were rather carefully calibrated. This resulted in certain difficulties with respect to maintaining consistency, and production problems were also experienced because of the size of the parts involved.

It is a general object of this invention to provide an improved turnstile construction which includes a brake or governor means.

It is a more particular object of this invention to provide a turnstile construction which is characterized by a brake mechanism which operates in a highly efficient manner and which can be produced on a consistent basis without undue difficulty.

It is a still further object of this invention to provide a brake mechanism which is ideally suited for applications such as those recited with respect to turnstile constructions.

These and other objects of this invention will appear hereinafter and for purposes of illustration, but not of limitation, specific embodiments of the invention are shown in the accompanying drawings in which:

FIG. 3 is an elevational view of drive arrangements actuated by turnstile arm movements including locking means, switch control means, and brake means;

FIG. 4 is a perspective view of brake and associated control means of the type contemplated by this invention;

Figure 1:
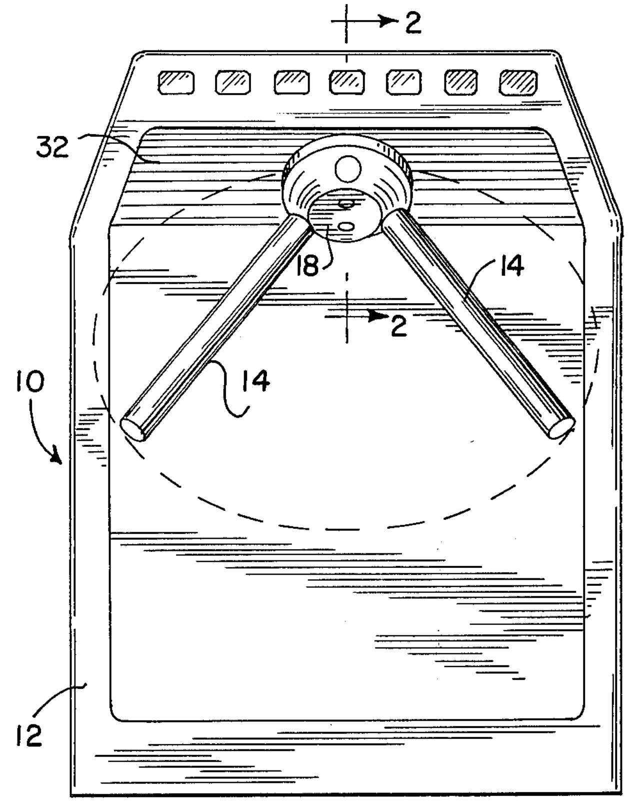
FIG. 1 is a front elevation of a turnstile construction which advantageously employs a brake mechanism of the type contemplated by this invention.

This invention generally relates to a turnstile construction wherein turnstile arms are engaged by persons passing through the construction. The arms are located on a support which is moved with the arms in response to the passage through the turnstile. The invention is particularly concerned with a brake mechanism which is associated with the arm support whereby the speed of movement of the support is limited. More specifically, the invention involves means for controlling the operation of the brake mechanism so that it will limit the speed of movement as the arms approach the end of the movement required for the passage of one person through the turnstile.

The invention involves the use of a brake mechanism including a pair of pivotally mounted brake shoes. The brake shoes are mounted on a carrier which is tied to the support for the arms so that the carrier will rotate in response to arm movement with centrifugal force being applied to the brake shoe means in response to this rotation. A brake drum is supported in position for engagement by the brake shoe means whereby, upon engagement of the brake shoe means with the shoe drum, a braking force resisting the arm movement will be developed.

The improvement of the invention comprises means for disabling the brake shoe means during a portion of the arm movement so that the braking action will not be developed during this portion of the arm movement. More specifically, the invention involves a brake construction which limits the capability for braking action to the final stages of movement during passage of a person through a turnstile. Thus, the braking action comes into play at the end of the arm movement to thereby insure against over-run of the arm or against the application of undue forces to the arm locking means which become operable at the end of the arm movement.

The particular construction of the invention involves the utilization of cam means directly tied to the support for the turnstile arms. These cam means, therefore, rotate with the turnstile arm so that the position of the turnstile arm directly controls the position of the cam means. A brake disabling element is operatively tied to a cam follower so that the brake disabling means will be controlled in accordance with the position of the cam means and, accordingly, in accordance with the position of the turnstile arms.

The disabling means for the brake comprises a spool structure which is operatively connected to the cam follower. The spool structure is movable toward and away from the brake shoe means whereby the spool structure controls the ability of the brake shoe means to engage the brake drum. More specifically, the spool structure is designed to restrain the movement of the brake shoe means in response to centrifugal forces applied thereto. This restraining action is maintained until the final stages of arm movement during a passage through the turnstile. At this point, the cam means operates to remove the restraining action whereby brake shoes are adapted to engage the brake drum.

The accompanying drawings illustrate a turnstile 10 which includes a brake mechanism of the type contemplated by this invention. The turnstile comprises a stanchion 12 supporting turnstile arms 14, one of which extends into the path of movement of a person desiring to pass through the turnstile. In accordance with conventional operation, a person passing through will move the one arm through 120° with the next arm then being moved to the blocking position.

Figure 2:
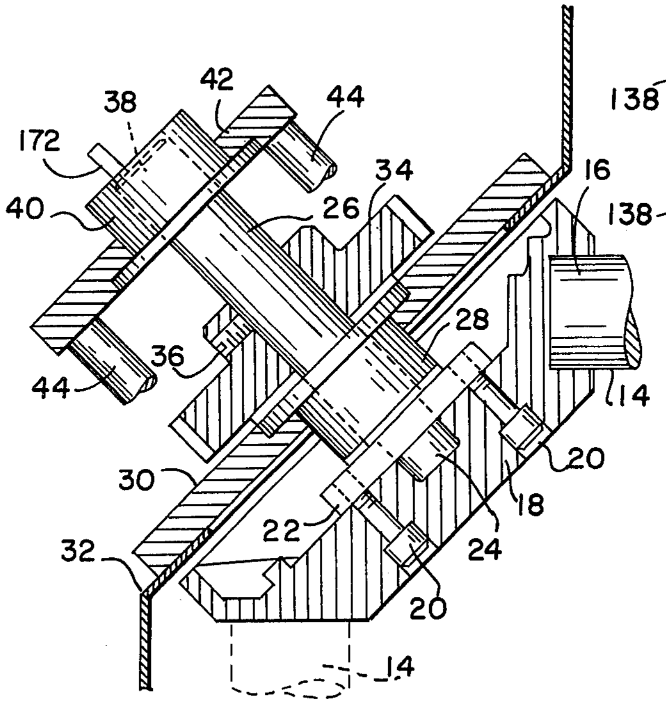
FIG. 2 is an enlarged vertical, sectional view taken about the line 2—2 of FIG. 1 and illustrating the turnstile arm supporting arrangement.
Figure 7:
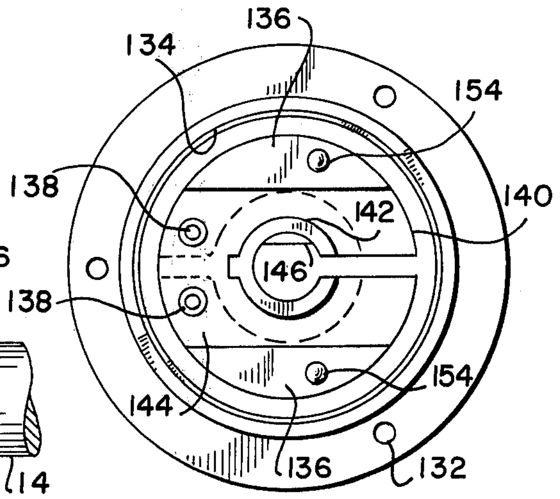

As best shown in Fig. 2, the ends 16 of the arms 14 are tightly secured to a disc support 18. This support is mounted by means of bolts 20 onto a plate 22. The end 24 of shaft 26 is received within the support 18 and within an opening in the plate 22. The shaft end and opening are preferably non-circular so that the shaft 26 is fixed for movement with the support 18.

The shaft 26 moves within bearing housing 28 which is supported on control support plate 30. This plate is attached by fasteners (not shown) to the wall 32 of stanchion 12. Accordingly, the shaft 26 is rotated relative to the plate 30 and housing wall whenever an arm 14 is moved from a blocking position during passage of an individual through the turnstile.

A drive gear 34 is secured by means of set screw 36 for rotation with the shaft 26. The opposite end 38 of the shaft 26 is received within bearing support 40, and this bearing is fastened to plate 42. The plate 42 is fixed in spaced relationship relative to the plate 30 by means of posts 44.

As best shown in FIG. 3, the drive gear 34 meshes with a first driven gear 46 and a second driven gear 48. The gear 46 is fixed to a supporting shaft 50 which also carries a switch actuating wheel 52. A plurality of switches are located around the wheel 52 for actuation as described in the aforementioned Collins patent.

The second driven gear 48 which is engaged with the main drive gear 34 has its ends journalled in the respective plates 30 and 42 in any conventional fashion. The shaft of this gear supports a gear 84 which is preferably connected to the shaft by means of a set screw received by the gear hub 86. The gear 84 is in driving engagement with a pair of evoloid gears, one of which comprises the gear 88 shown in FIG. 3.

The evoloid gears are also journalled in the plates 30 and 42. The gear 88 has a first locking means 92 associated therewith, and the other gear is associated with a corresponding locking means. Each locking means includes a cylindrical portion 95 which comprises the outer race of a conventional one-way clutch assembly. A ring 96 is tied to each cylindrical portion, and each ring 96 is provided with teeth 98 positioned at 90° intervals on the respective rings.

As best explained in the aforementioned Collins patent, the locking means including the rings 96 and teeth 98 are utilized in conjunction with crank arms which are adapted to be pivoted into the path of movement of the locking means engaged. Each of the arms is connected by means of a link 110 to the core 112 of a solenoid 114.

A centrifugal brake 124 is associated with at least one of the gears 88 to prevent unduly rapid movement through the turnstile. Thus, the brake acts as a speed governor to limit the rotation of a gear 88 to a maximum speed which in turn limits the maximum speed of the turnstile arms. A person moving through the turnstile will thus encounter resistance of the arms if an attempt is made to run through. This insures efficient operation of the control elements.

The particular centrifugal brake construction of this invention is best shown in FIGS. 4 through 7, and as indicated, this construction is mounted on the plate 42. The construction consists of a brake drum 126 having an upstanding wall section 128 and a flange portion 130. The latter is provided with openings 132 to permit fastening of the brake drum in a stationary position relative to the plate 42.

The inside surface of the wall portion 128 is provided with a lining 134. This lining may comprise an asbestos composition or any other material suitable for providing the necessary gripping characteristics relative to the brake shoes employed.

The brake shoes comprise generally semi-circular elements 136 which may be formed of a phosphor bronze material. These brake shoes are pivotally connected at 138 to a brake hub construction 140. The brake hub comprises an upstanding cylindrical section 142 in addition to having transverse walls 144 which provide the pivotal connection for the brake shoes 136.

The brake hub 140 is tied to the shaft of gear 88 for rotation with this gear. A flat 146 is defined by the hub whereby a corresponding surface of the gear shaft can be engaged with the hub to achieve the desired driving connection. Preferably a set screw is also utilized to tie the hub and shaft together.

Figure 5:
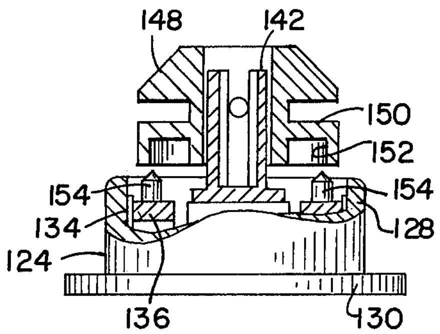
FIG. 5 is an elevational view, partly cut away, illustrating the brake mechanism in operation position.
Figure 6:
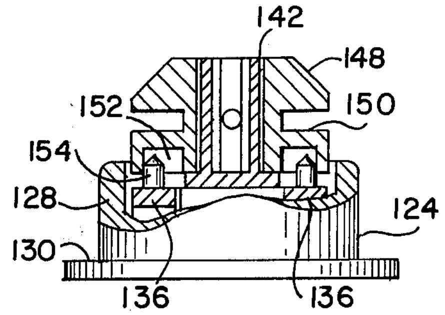
FIG. 6 is an elevational view, partly cut away, illustrating the brake mechanism when rendered inoperative; and, FIG. 7 is a plan view illustrating the brake hub, drum, and brake shoes in assembly.

A spool element 148 is supported on the cylindrical section 142 of the brake hub 140. This spool element defines an annular groove 150 in its side wall, and a second annular groove 152 in its bottom wall. As best shown in FIGS. 5 and 6, the spool element is loosely maintained relative to the cylindrical section 142 whereby the spool element is adapted to shift longitudinally relative to the cylindrical section.

The brake shoes 136 each carry an outwardly extending pin 154. The annular grove 152 of the spool element is adapted to receive these pins when in the position of the spool element shown in FIG. 6. When the spool element is raised to the position shown in FIG. 5, the pins are released relative to the annular groove 152. The upper ends of the pins are hemispherical in shape to facilitate movement into the groove 152 when the spool is lowered.

Movement of the spool 152 is controlled by a pin 156 connected to pivoting yoke 158. An extension 160 of the pin 156 serves to hold one end of spring 162 with the other end of this spring being tied to the plate 42. The plate 42 also carries a post structure 164 which carries a rod 166. The arms of the yoke 158 are pivotally mounted around the rod 166.

The hoke 158 also supports a cam follower 168. This cam follower engages the surface of the cam 170. The cam 170 is, in turn, supported on the bearing support 40.

As shown in FIG. 2, the shaft 38 carries a drive transmission pin 172 and, as shown in FIG. 4, this pin is received by a slot 174 defined by the cam 170. The cam 170 is thereby tied to the shaft 38 for movement with the shaft. The slot 174 is provided since the turnstile arms are adapted to be moved through a number of degrees even without a fare deposit, for example, by someone pulling rearwardly on the turnstile arms. The slot 174, which encompasses approximately 80° of movement permits such shifting of the turnstile support without affecting the cam operation.

The cam 170 includes three rises 176 spaced apart by 120°. This arrangement is consistent with the use of three turnstile arms permitting one person to pass through a turnstile with 120° movement of the turnstile support. It will be apparent that changes in this relationship would be made consistent with the particular application involved.

Considering the operation of the construction described, it will be noted that the spring 162 normally pulls the yoke 158 toward the plate 42. This results in the location of the spool 148 in the position shown in FIG. 6 whereby the brake shoes 136 are held against outward movement toward the brake lining 134. Under this condition of the construction, centrifugal force applied by the shaft 88 will not result in engagement of the brake shoes with the brake lining. Thus, the brake arrangement is effectively disabled when the spool is in this position.

As the cam 170 moves in response to the action of transmission pin 172, a rise 176 will engage the cam follower 168 once during each 120° of rotation. The cam follower and associated yoke are driven away from the plate 42 in opposition to spring 162 once during each 120° of movement. Accordingly, the pin 156 will operate to drive the spool 148 upwardly during this phase of the operation. This releases the brake arms 136 whereby the brake arms are adapted to engage the lining of the associated brake drum.

The arrangement described provides a highly effective means for achieving a selective braking capability. In accordance with the preferred operation of a turnstile characterized by this invention, the braking mechanisms are enabled only during a small portion of each operating cycle. This involves approximately 20° of movement during a 120° operating cycle. The rises of the cam are preferably located, in the case of a turnstile operation, in a position for permitting brake engagement at the very end of an operating cycle. This permits substantially unimpeded movement of the turnstile arms during the majority of an operating cycle and, if the person using the turnstile does not impart undue speed to the arms, the final portion of the movement will also be without significant effort. On the other hand, if exceptionally high speed is involved, then braking mechanisms become operable before completion of the movement. Accordingly, the movement through the turnstile will be completed in a controlled fashion.

It will be appreciated that the greater the speed built up in the arms, the greater the braking action achieved. Thus, the brake shoes, when unimpeded, will be forced heavily against the brake drum when necessary for significantly slowing down the arm speed while a lesser braking force will be achieved under lower speed conditions. The arrangement of this invention described accomplishes this braking force without the utilization of calibrated springs or other mechanisms requiring carefully controlled production standards or skilled assembly operations.

It will be understood that varioud changes and modifications may be made in the above described construction without departing from the spirit of the invention, particularly as defined in the following claims.

That which is claimed is:

1. In a turnstile construction wherein arms are engaged by persons passing through the turnstile thereby moving a support for the arms, the improvement comprising a brake mechanism for limiting the speed of movement of the support, said brake mechanism including a brake drum, a pivotally mounted brake shoe means, a carrier for said brake shoe means rotatably mounted relative to said brake drum, rotation of said carrier imparting centrifugal force to said brake shoe means whereby the brake shoe means are adapted to engage said brake drum, said carrier being operatively connected to said support whereby movement of the support imparts rotary movement to said carrier, means for retaining said brake shoe means in spaced relationship relative to said brake drum, and means for releasing said retaining means after a predetermined degree of movement of said carrier.

2. A construction in accordance with claim 1 including a cam means drivingly connected to said support, a cam follower connected to said means for releasing said retaining means, said cam defining rises for moving said cam follower, and said means for releasing said retaining means.

3. A construction in accordance with claim 2 wherein said retaining means comprise a spool, pins carried by said brake shoe means, said means for releasing said retaining means comprising a drive pin movable by said cam follower for moving said spool into and out of engagement with said pins on said brake shoe means.

4. A construction in accordance with claim 3 including a pivotally mounted yoke supporting said cam follower and said drive pin, and spring means biasing said yoke into a position so that said drive pin forces said spool into position for retaining said brake shoe means in spaced relationship relative to said brake drum.

5. A brake mechanism for limiting the speed of movement of an associated support, said brake mechanism including a brake drum, a pivotally mounted brake shoe means, a carrier for said brake shoe means rotatably mounted relative to said brake drum, rotation of said carrier imparting centrifugal force to said brake shoe means whereby the brake shoe means are adapted to engage said brake drum, said carrier being operatively connected to said support whereby movement of the support imparts rotary movement to said carrier, means for retaining said brake shoe means in spaced relationship relative to said brake drum, and means for releasing said retaining means after a predetermined degree of movement of said carrier.

6. A construction in accordance with claim 5 including a cam means drivingly connected to said support, a cam follower connected to said means for releasing said retaining means, said cam defining rises for moving said cam follower, and said means for releasing said retaining means.

7. A construction in accordance with claim 6 wherein said retaining means comprise a spool, pins carried by said brake shoe means, said means for releasing said retaining means comprising a drive pin movable by said cam follower for moving said spool into and out of engagement with said pins on said brake shoe means.

8. A construction in accordance with claim 7 including a pivotally mounted yoke supporting said cam follower and said drive pin, and spring means biasing said yoke into a position so that said drive pin forces said spool into position for retaining said brake shoe means in spaced relationship relative to said brake drum.

* * * * *